(12) United States Patent
Nishida et al.

(10) Patent No.: US 9,278,615 B2
(45) Date of Patent: Mar. 8, 2016

(54) FUEL TANK STRUCTURE OF STRADDLE TYPE VEHICLE

(71) Applicant: HONDA MOTOR CO., LTD., Tokyo (JP)

(72) Inventors: Yoichi Nishida, Wako (JP); Yoshihiro Inoue, Wako (JP)

(73) Assignee: Honda Motor, Co., Ltd., Tokyo (JP)

( * ) Notice: Subject to any disclaimer, the term of this patent is extended or adjusted under 35 U.S.C. 154(b) by 0 days.

(21) Appl. No.: 14/224,150

(22) Filed: Mar. 25, 2014

(65) Prior Publication Data

US 2014/0290769 A1 Oct. 2, 2014

(30) Foreign Application Priority Data

Mar. 28, 2013 (JP) .................................. 2013-070223

(51) Int. Cl.
  *B62J 35/00* (2006.01)
  *B60K 15/03* (2006.01)

(52) U.S. Cl.
  CPC ........... *B60K 15/03006* (2013.01); *B62J 35/00* (2013.01); *Y10T 137/86035* (2015.04)

(58) Field of Classification Search
  CPC ............... B62J 35/00; B60K 15/03006; Y10T 137/86035
  USPC ........................................................ 280/835
  See application file for complete search history.

(56) References Cited

U.S. PATENT DOCUMENTS

| | | | | |
|---|---|---|---|---|
| 4,469,190 A * | 9/1984 | Yamaguchi | .................... | 180/219 |
| 4,509,613 A * | 4/1985 | Yamaguchi | .................... | 180/219 |
| 6,213,514 B1 * | 4/2001 | Natsume et al. | ............... | 280/833 |
| 6,641,169 B2 * | 11/2003 | Fukunaga et al. | ............. | 280/835 |
| 7,040,294 B2 * | 5/2006 | Yagisawa et al. | ............... | 123/468 |
| 7,390,023 B2 * | 6/2008 | Hirose et al. | .................... | 280/835 |
| 7,410,191 B2 * | 8/2008 | Karube et al. | ................. | 280/833 |
| 7,416,220 B2 * | 8/2008 | Nakazawa et al. | ............ | 280/835 |
| 7,422,243 B2 * | 9/2008 | Kudo et al. | .................... | 280/834 |
| 7,681,682 B2 * | 3/2010 | Miyashiro | ...................... | 180/219 |
| 7,841,625 B2 * | 11/2010 | Gruber et al. | ................. | 280/835 |
| 7,997,622 B2 * | 8/2011 | Yamada | ......................... | 280/835 |
| 8,292,115 B2 * | 10/2012 | Kobayashi et al. | ........... | 220/562 |
| 8,662,518 B2 * | 3/2014 | Koike | .......................... | 280/288.4 |
| 2002/0063004 A1 * | 5/2002 | Nagasaka | .................... | 180/69.4 |
| 2009/0322069 A1 * | 12/2009 | Koike | ............................. | 280/835 |
| 2011/0100742 A1 * | 5/2011 | Shibata et al. | ................ | 180/219 |
| 2011/0204613 A1 * | 8/2011 | Aoki | ............................. | 280/830 |

FOREIGN PATENT DOCUMENTS

JP   2005-343211 A   12/2005

* cited by examiner

*Primary Examiner* — Joseph Rocca
*Assistant Examiner* — Michael Stabley
(74) *Attorney, Agent, or Firm* — Birch, Stewart, Kolasch & Birch, LLP

(57) ABSTRACT

A fuel tank structure of straddle type vehicle in which a wide space below the fuel tank can be secured and a clearance portion for avoiding the fuel tank interfering with the vehicle body side can be downsized. The fuel tank is supported on and disposed above a main frame with a fuel pump being installed to a bottom plate of the rear portion of the fuel tank. A maintenance space formed below the fuel pump when the rear portion of the fuel tank is lifted in a state wherein an installation portion of a front bracket installed to the front lower portion of the fuel tank is rotatably supported on the main frame. The fuel tank is configured such that the installation portion of the lower end of the front bracket is disposed below the bottom plate, simultaneously, and is installed to the main frame with a bolt.

16 Claims, 9 Drawing Sheets

FUEL TANK STRUCTURE OF STRADDLE TYPE VEHICLE

CROSS-REFERENCE TO RELATED APPLICATIONS

The present application claims priority under 35 USC 119 to Japanese Patent Application No. 2013-070223 filed Mar. 28, 2013 the entire contents of which are hereby incorporated by reference.

BACKGROUND OF THE INVENTION

1. Field of the Invention

The present invention relates to a fuel tank structure for a straddle type vehicle in which a fuel tank is rotated around the supporting portion with a maintenance space formed under the fuel tank.

2. Background of the Invention

A fuel tank structure for a straddle type vehicle is known wherein the front portion of the fuel tank is swingably installed to the body frame and the rear portion of the fuel tank is lifted against the body frame for maintenance. See, for example, Japanese Laid-Open Patent Publication No. 2005-343211.

In Japanese Laid-Open Patent Publication No. 2005-343211, since a swing shaft of the fuel tank is disposed behind the front end of the fuel tank, the fuel tank needs a larger rotation angle for securing a wide maintenance space below the fuel tank. Accordingly, the front portion of the fuel tank is largely recessed for avoiding the interference between the front end of the fuel tank and the vehicle body side.

OBJECTS AND SUMMARY OF THE INVENTION

According to an embodiment of the present invention, a fuel tank structure of straddle type vehicle includes a wide space below the fuel tank that can be secured with a clearance portion being provided for avoiding the fuel tank interfering with the vehicle body side to enable downsizing.

In order to solve the above-mentioned problem, in a fuel tank structure of straddle type vehicle including a body frame (F) having a head pipe (13) and a main frame (14) extending from the head pipe (13) to the rearward direction, a fuel tank (19) is supported on the main frame (14) and disposed above the main frame (14) with a fuel pump (51) installed to a tank bottom plate (67) of the rear portion of the fuel tank (19). A maintenance space (80) is formed below the fuel pump (51) when the rear portion of the fuel tank (19) is lifted in a state wherein a front supporting portion (53c) of the fuel tank (19) is rotatably supported on the main frame (14). The front supporting portion (53c) of the fuel tank (19) is disposed on a front bracket (53) extending from the tank bottom plate (67) to the downward direction.

According to an embodiment of the present invention, the overlap between the front portion of the fuel tank and the main frame in the side view can be reduced and the wide space below the fuel tank can be secured by disposing a rotation shaft of the fuel tank below the tank bottom plate with or without the rotation of the fuel tank. Moreover, the tank capacity can be secured by reducing the clearance of the fuel tank.

According to an embodiment of the present invention, the front supporting portion (53c) may be disposed below the front end of the fuel tank (19) when the fuel tank (19) is mounted on the vehicle. According to the structure, increasing the distance between the fuel pump and the front supporting portion can expand the maintenance space below the fuel pump with a small rotating angle. Reducing the clearance of the fuel tank can secure the tank capacity.

According to an embodiment of the present invention, a fuel piping (61) extending from the fuel pump (51) may be configured so as to be connected with one end of the fuel piping to the fuel pump (51) below the fuel tank (19), to pass the rearward direction and the one side of the fuel pump (51) in the width direction of the vehicle, and to extend to the frontward direction of the fuel pump (51). According to the structure, the interference with the fuel piping can be avoided due to the fact that the passenger performs the maintenance of the fuel piping below the fuel tank from the right side in the width direction of the vehicle.

According to an embodiment of the present invention, a side stand (64) may be disposed on the one side of the straddle type vehicle (1) in the width direction of the vehicle. According to the structure, the fuel supply to the engine during the idling stop with the side stand down can be improved by disposing the fuel piping on the same side with the side stand. The vehicle body is inclined such that the other side thereof in the width direction of the vehicle becomes the upper side of the vehicle body during the maintenance. Accordingly, the maintenance space below the fuel tank faces in the upward direction, which improves the maintenance performance.

According to an embodiment of the present invention, the main frames (14) are provided in the right and left pair and bifurcated from the head pipe (13) to the right and left and extending in the rearward direction so as to be inclined downward, and the front supporting portion (53c) may be supported by a bolt (56) screwed in the width direction of the vehicle to a boss portion (14a) formed on the outer surface of the main frame (14). According to the structure, the fuel tank is rotatable around the front supporting portion with the bolt loosened, and can be fixed on the main frame with the bolt tightened.

According to an embodiment of the present invention, the fuel tank (19) may have a recess portion (19a) recessed in the rearward direction in the center of the front end of the fuel tank. According to the structure, the interference between the fuel tank and the components and the likes in the vehicle body side can be avoided. Simultaneously, the components and the like in the vehicle body side can restrict the slant of the fuel tank to the frontward direction.

According to an embodiment of the present invention, a radiator (20r) may be disposed in the outer side direction of the body frame (F) with the side radiator shroud (25) covering the upper portion of the radiator (20r) and the side direction of the front supporting portion (53c).

According to an embodiment of the present invention, the front supporting portion can be protected without increasing the number of the components due to the fact that the side radiator shroud also covers the front supporting portion.

According to an embodiment of the present invention, a center frame (15) configuring the body frame (F) may be connected to the rear end of the main frame (14), a rear installation portion (54c) provided on the rear portion of the fuel tank (19) may be installed to the center frame (15), a side cover (27) may be disposed below the fuel tank (19) and cover the rear installation portion (54c). According to the structure, the rear installation portion can be protected without increasing the number of the components due to the fact that the side cover covering below the fuel tank also covers the rear installation portion.

According to an embodiment of the present invention, the rear installation portions (54c) are provided on both ends projecting to the outer side in the width direction of the vehicle of the rear bracket (54) installed to the tank bottom plate (67), and the rear bracket (54) may be installed to the tank bottom plate (67) along the pump installation portion (67a) provided on the tank bottom plate (67) for installing the fuel pump (51). According to the structure, the rear bracket can reinforce the pump installation portion, which makes possible not to use special reinforcement member or to downsize the reinforcement member.

According to an embodiment of the present invention, the fuel tank is configured such that the front supporting portion is disposed on the front bracket extending from the tank bottom plate to the downward direction. Accordingly, the overlap between the front portion of the fuel tank and the main frame in the side view can be reduced and the wide space below the fuel tank can be secured with or without the rotation of the fuel tank. Moreover, the tank capacity can be secured by reducing the clearance of the fuel tank.

According to an embodiment of the present invention, the front supporting portion is disposed below the front end of the fuel tank when the fuel tank is mounted on the vehicle body. Accordingly, increasing the distance between the fuel pump and the front supporting portion can expand the maintenance space below the fuel pump with a small rotating angle. Reducing the clearance of the fuel tank can secure the tank capacity.

In addition, the fuel piping extending from the fuel pump is configured so as to be connected with the one end of the fuel piping to the fuel pump below the fuel tank, to pass the rearward direction and the one side of the fuel pump in the width direction of the vehicle, and to extend to the frontward direction of the fuel pump. Accordingly, the interference with the fuel piping can be avoided due to the fact that the passenger performs the maintenance of the fuel piping below the fuel tank from the other side in the width direction of the vehicle.

According to an embodiment of the present invention, the side stand is disposed on the one side of the straddle type vehicle in the width direction of the vehicle. The fuel supply to the engine during the idling stop with the side stand down can be improved by disposing the fuel piping on the same side with the side stand. The vehicle body is inclined such that the other side thereof in the width direction becomes the upper side of the vehicle body during the maintenance. Accordingly, the maintenance space below the fuel tank is faced to the upward direction, which improves the maintenance performance.

In addition, the main frames are provided in the right and left pair and bifurcated from the head pipe to the right and left and extending to the rearward direction so as to be inclined downward, and the front supporting portion is supported by the bolt screwed in the width direction of the vehicle to the boss portion formed on the outer surface of the main frame. Accordingly, the fuel tank is rotatable around the front supporting portion with the bolt loosened, and can be fixed on the main frame with the bolt tightened.

According to an embodiment of the present invention, the fuel tank has a recess portion recessed to the rearward direction in the center of the front end of the fuel tank. Accordingly, the interference between the fuel tank and the components and the like in the vehicle body side can be avoided. Simultaneously, the components and the like in the vehicle body side can restrict the slant of the fuel tank to the frontward direction.

In addition, the radiator is disposed in the outer side direction of the body frame, and the side radiator shroud covers the upper portion of the radiator and the side direction of the front supporting portion. Accordingly, the front supporting portion can be protected without increasing the number of the components due to the fact that the side radiator shroud also covers the front supporting portion.

According to an embodiment of the present invention, the center frame configuring the body frame is connected to the rear end of the main frame, the rear installation portion provided on the rear portion of the fuel tank is installed to the center frame, the side cover is disposed below the fuel tank and covers the rear installation portion. Accordingly, the rear installation portion can be protected without increasing the number of the components due to the fact that the side cover covering below the fuel tank also covers the rear installation portion.

In addition, the rear installation portions are provided on both ends projecting to the outer side in the width direction of the vehicle of the rear bracket installed to the tank bottom plate. The rear bracket is installed to the tank bottom plate along the pump installation portion provided on the tank bottom plate for installing the fuel pump. Accordingly, the rear bracket can reinforce the pump installation portion. Thus, it is possible to not use a special reinforcement member or to downsize the reinforcement member.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the one embodiment of the present invention will be explained with reference to the drawings. Moreover, in the explanation, the descriptions of directions including "front and rear," "right and left," and "up and down" are the same as the directions of the vehicle body unless it is specifically described. In addition, a sign "FR" in each drawing shows the frontward direction of the vehicle body, a sign "UP" shows the upward direction of the vehicle body, a sign "LE" shows the left direction of the vehicle body.

Figure 1:
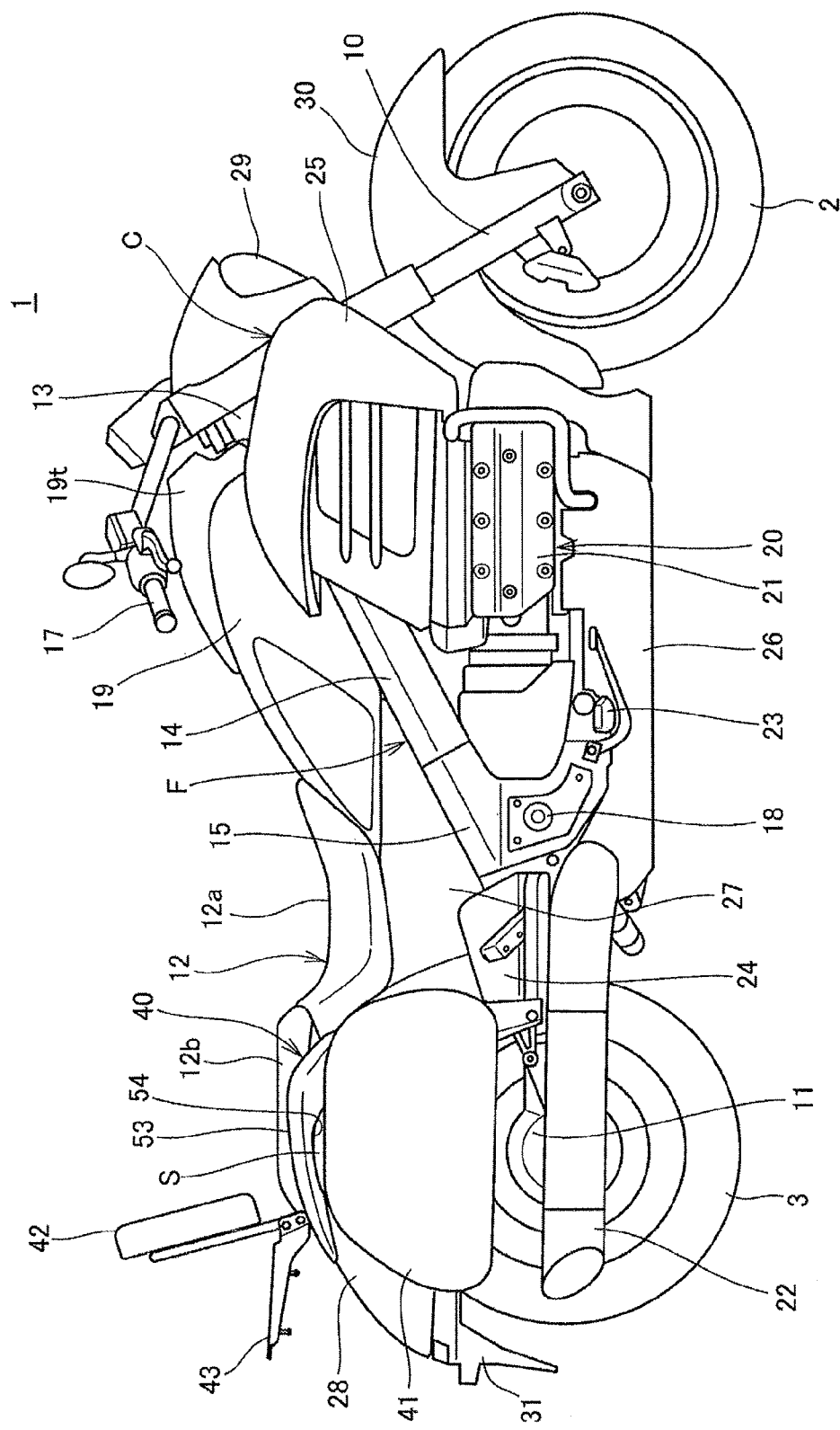
FIG. 1 is a right side view showing the motorcycle related to one embodiment of the present invention.

FIG. 1 is a right side view showing a motorcycle 1 related to the one embodiment of the present invention.

The motorcycle 1 is a straddle type vehicle configured such that an engine 20 is supported on the lower portion of a body frame F with a front fork 10 supporting a front wheel 2 is steerably supported on the front end of the body frame F. A swing arm 11 supporting a rear wheel 3 is provided on the rear side of the body frame F. Moreover, the motorcycle 1 is configured such that a seat 12 on which the passenger sits is provided above the body frame F, a resin body cover C covers a part of the body frame F.

The body frame F has a head pipe 13 provided on the front end with a pair of right and left main frames 14 obliquely extending downwardly to the rear direction from the head pipe 13. A pair of right and left center frames 15 are positioned on the center in the longitudinal direction of the vehicle and simultaneously extend from the rear end of the main frame 14 to the downward direction. A pair of right and left seat rails 16 (see FIG. 3) extend rearwardly to the upper direction from the upper portion of the center frame 15 to the rear portion of the vehicle.

The front fork 10 is rotatably supported on the head pipe 13. The front wheel 2 is supported on the lower end portion of the front fork 10. A handle bar 17 is fixed on the upper end of the front fork 10.

The swing arm 11 is rotatably supported on a pivot shaft 18 inserted into the center frame 15 in the width direction of the vehicle, the rear wheel 3 is supported on the rear end of the swing arm 11.

An engine 20 is a four cycle multi-cylinder horizontal opposed engine. A crank shaft (not shown) is disposed directing in the front and rear directions. A cylinder portion 21 horizontally projects to the right and left directions. The exhaust pipe (not shown) of the engine 20 is extracted from the lower portion of the cylinder portion 21 and extends in the rearward direction passing below the engine 20 and is connected to a pair of right and left mufflers 22 provided on the sides of the swing arm 11.

The fuel tank 19 is disposed above the main frame 14 and extends from the vicinity of the head pipe 13 to the upward direction of the center frame 15. A tank front cover 19t covering the periphery of a fuel filler opening 45 is installed on the front upper portion of the fuel tank 19.

The seat 12 has a front seat 12a on which the driver sits and a rear seat 12b on which the pillion passenger sits. The seat is continuously provided on the rear end of the fuel tank 19, and extends to the rear portion of the vehicle. A driver's step 23 is provided ahead of the front seat 12a and on the lower portion of the center frame 15. A plate like foldable tandem step 24 for the pillion passenger is disposed below the rear portion of the front seat 12a.

A body cover C has a pair of right and left side radiator shrouds 25 covering the front portion of the main frame 14, the upper portion of the engine 20 and a radiator 20r (see FIG. 9) from the side direction. An undercover 26 covers the engine 20 from the downward direction with a pair of right and left side covers 27 covering below the front seat 12a. A rear cover 28 covers the upper portion of the rear wheel 3.

The head light 29 is provided in front of the head pipe 13. A front fender 30 covers the upper portion of the front wheel 2.

A grab rail 40 which the pillion passenger grabs is provided in the side direction of the rear seat 12b. A pair of right and left saddle bags 41 is provided below the grab rail 40 and in the side direction of the rear cover 28. Moreover, a backrest 42 and a rear carrier 43 are provided on the rear portion of the vehicle.

Figure 2:
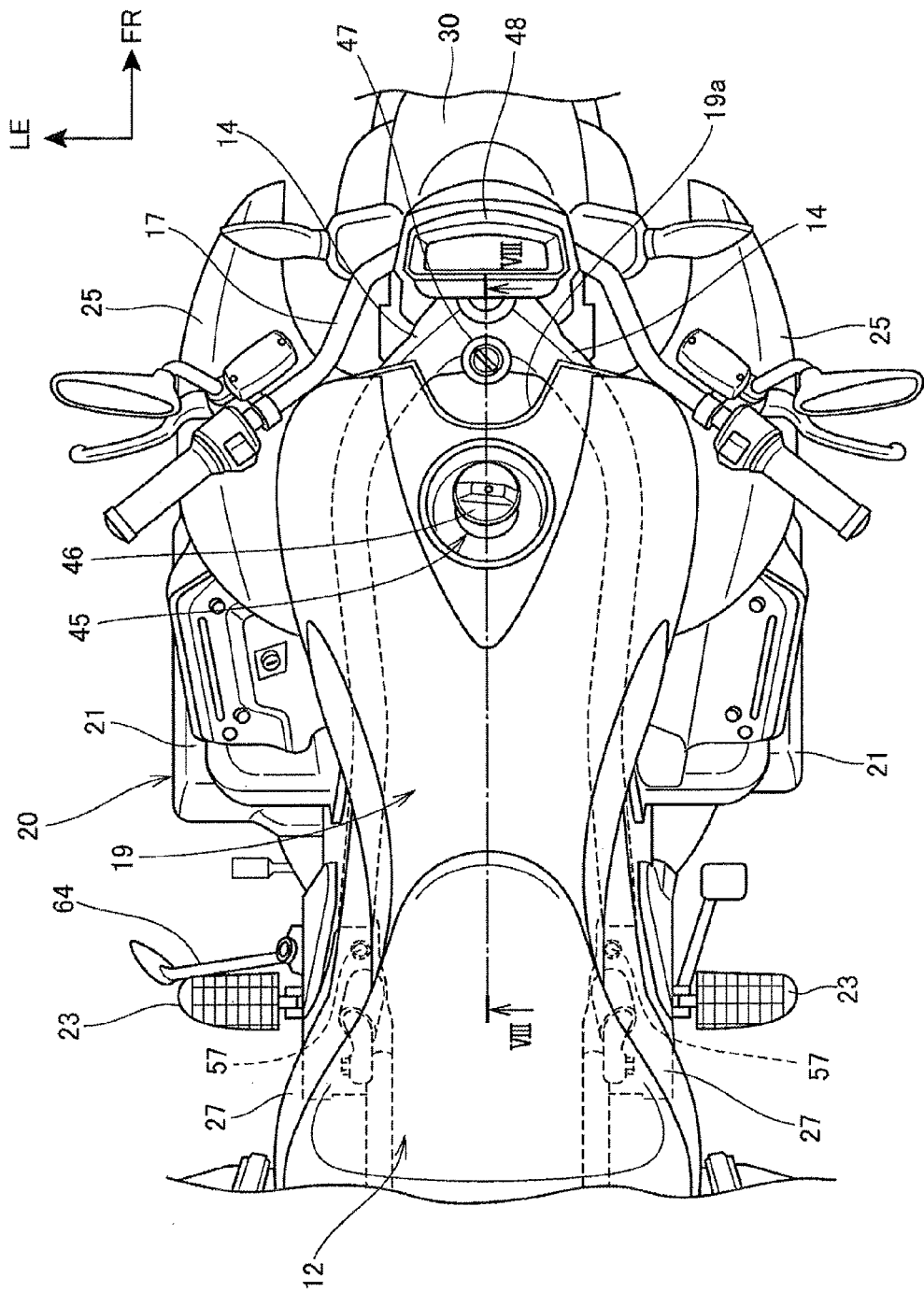
FIG. 2 is a plain view of the main part showing the front portion of the vehicle body.

FIG. 2 is a plain view of the main part showing the front portion of the vehicle body. The tank front cover 19t surrounding the fuel filler opening 45 of the fuel tank 19 (see FIG. 1) is detached. Moreover, a sign 46 shows a filler cap covering the fuel filler opening 45.

A handle bar 17 extends so as to open obliquely outward from the head pipe 13 (see FIG. 1) side to the rearward direction in the width direction of the vehicle. The fuel tank 19, with the wide front portion and with the constricted rear portion, is disposed long in the front and rear direction behind the handle bar 17, and the seat 12 is disposed behind the fuel tank 19.

A recess portion 19a recessed to the rearward direction is formed on the front end portion of the fuel tank 19. A key cylinder 47 installed on the front end portion of the main frame 14 is disposed in the recess portion 19a. Moreover, a sign 48 shows a meter installed to the center portion of the handle bar 17.

The side radiator shrouds 25, 25 are disposed on both side directions of the front portion of the fuel tank 19 so as to extend ahead of the fuel tank 19.

Figure 3:
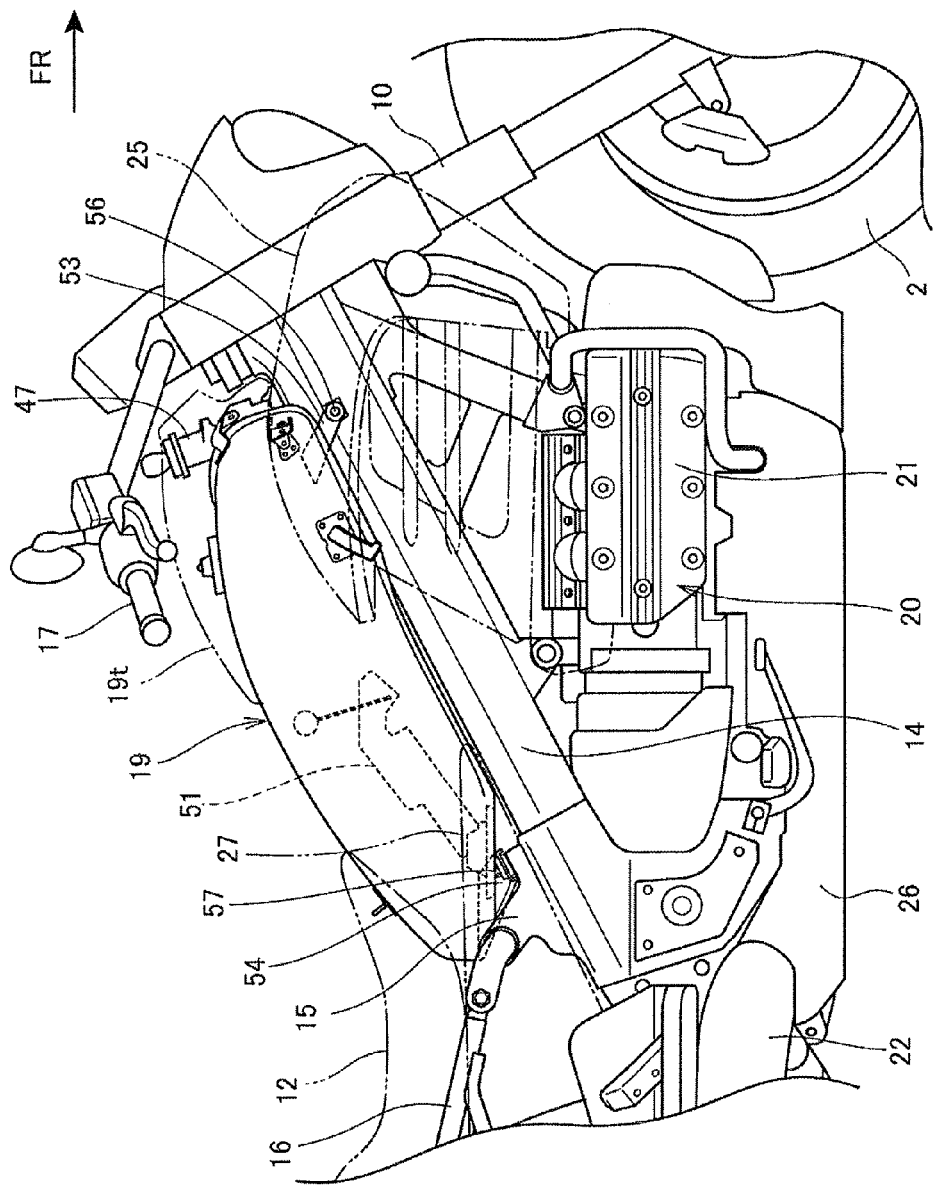
FIG. 3 is a right side view of the main part showing the front portion of the vehicle body.

FIG. 3 is a right side view of the main part showing the front portion of the vehicle body, which shows a state that the seat 12, the tank front cover 19t, the side radiator shroud 25, and the side cover 27 and the likes are detached from the state shown in FIG. 1.

The fuel tank 19 is disposed rearwardly to the lower direction along the main frame 14. A fuel pump 51 is housed in the rear portion of the fuel tank 19, which is lower than the front portion of the fuel tank. The key cylinder 47 installed to the main frame 14 is disposed in the front end portion side of the fuel tank 19.

The fuel tank 19 is configured such that a pair of right and left front brackets 53 installed to the outer side surface of the right and left of main frames 14 are provided on the front end portion of the fuel tank, rear brackets 54 installed to the upper portion of the right and left of the center frame 15 are provided on the rear portion of the fuel tank. Moreover, a bolt 56 is screwed to the outer side surface of the main frame 14 for installing the front bracket 53. In addition, a bolt 57 is screwed to the front upper portion of the right and left of center frames 15 for installing the rear bracket 54.

The side radiator shroud 25 covers the front bracket 53 from the side direction. The side cover 27 covers the rear bracket 54 from the side direction.

Figure 4:
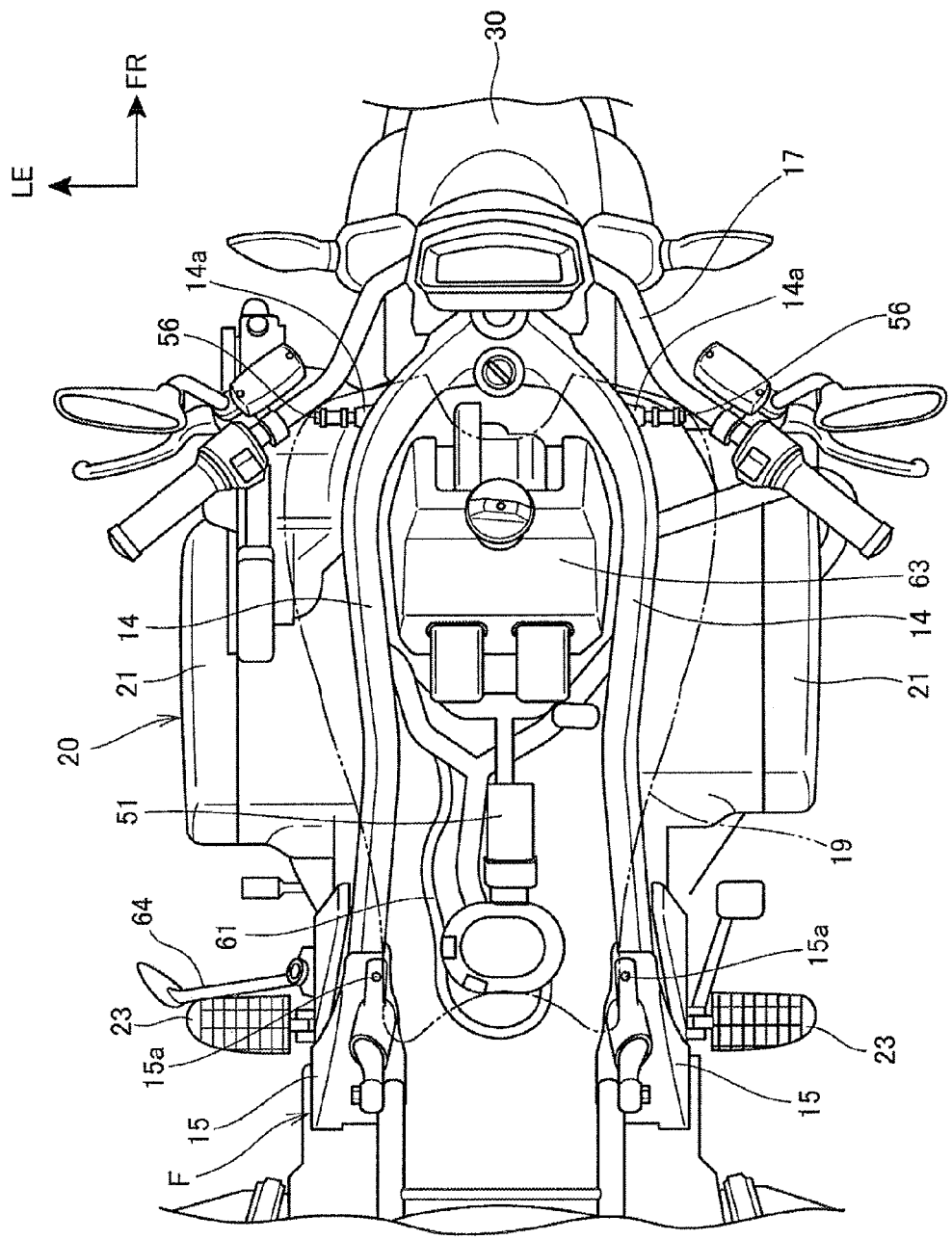
FIG. 4 is a plain view of the main part showing the state in which the fuel tank and the like are detached from the front portion of the vehicle body.

FIG. 4 is a plain view of the main part showing the state in which the fuel tank 19 and the like are detached from the front portion of the vehicle body.

The right and left of main frames 14, 14 extend from the head pipe 13 (see FIG. 1) obliquely outwardly to the rear direction in the width direction of the vehicle, and extend further rearwardly so as to be connected to the right and left of center frames 15, 15.

Boss portions 14a are formed on the outer side surfaces of the portion of the right and left of main frames 14, 14 extending obliquely outwardly to the rear direction in the width direction of the vehicle, respectively. An internal thread (not shown) is formed in the boss portion 14a. Bolts 56, 56 installed to the right and left of front brackets 53 (see FIG. 3) of the fuel tank 19 are screwed into the internal threads. Bolts 56, 56 extend to the width direction of the vehicle. Moreover, internal threads 15a for installing the right and left of the rear brackets 54 (see FIG. 3) of the fuel tank 19 with bolt are formed on the upper surfaces of the front end portions of the right and left of center frames 15, 15, respectively.

One end of a fuel piping 61 is connected to the fuel pump 51 disposed on the rear portion in the fuel tank 19. The fuel piping 61 extends from the fuel pump 51 to the rearward direction. Then, the fuel piping makes a U-turn and extends in the left direction of the fuel pump 51 in the width direction of the vehicle to the frontward direction of the vehicle. The other end of the fuel piping 61 is connected to a fuel injection valve (not shown) provided on an intake device (not shown) of the engine 20. Moreover, an air cleaner 63 is disposed between the right and left of main frames 14, 14, and is disposed above the engine 20. In addition, a side stand 64 is provided on the lower portion of the left side of the body frame F.

Figure 5:
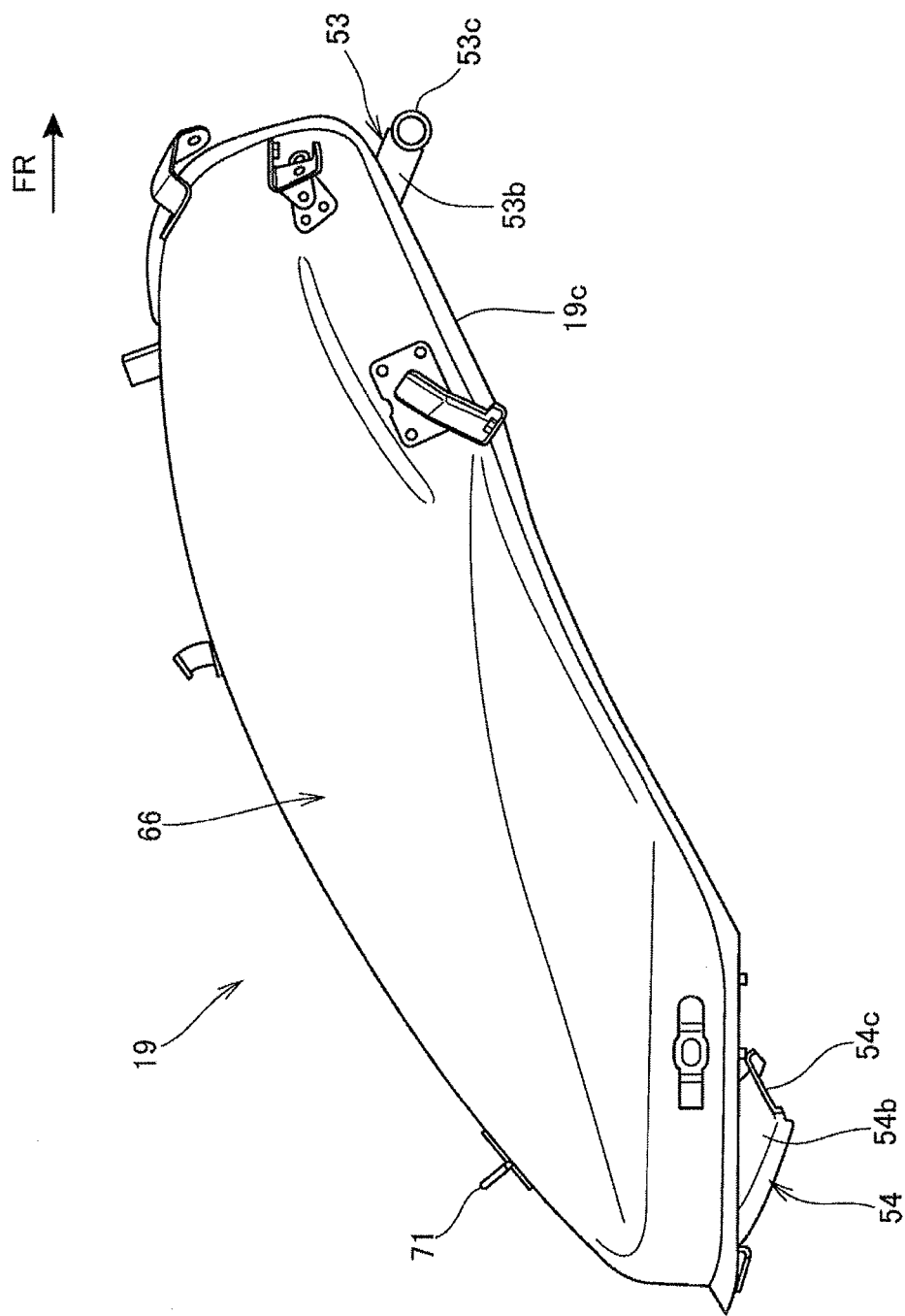
FIG. 5 is a side view showing the fuel tank.
Figure 6:
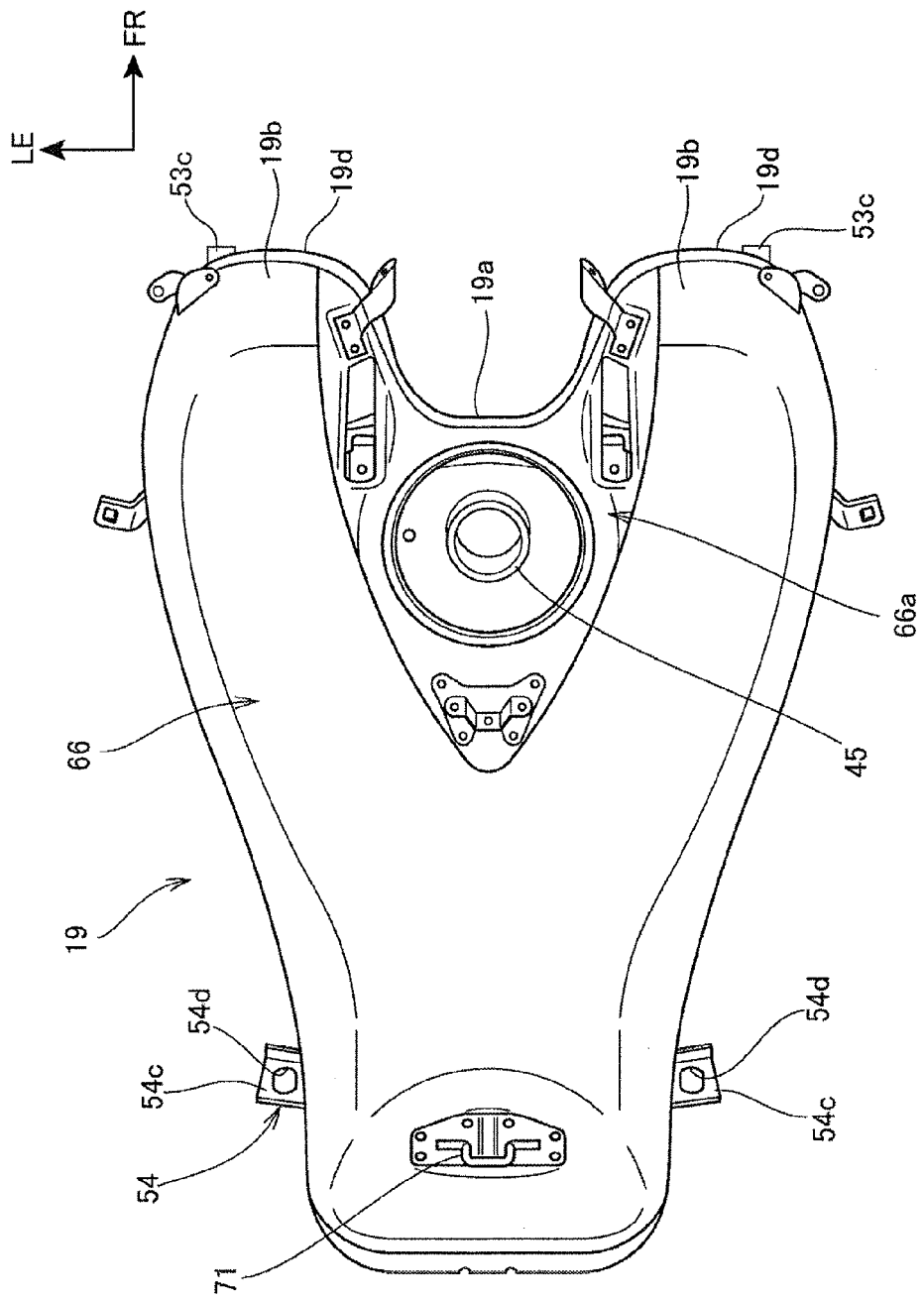
FIG. 6 is a plain view showing the fuel tank.
Figure 7:
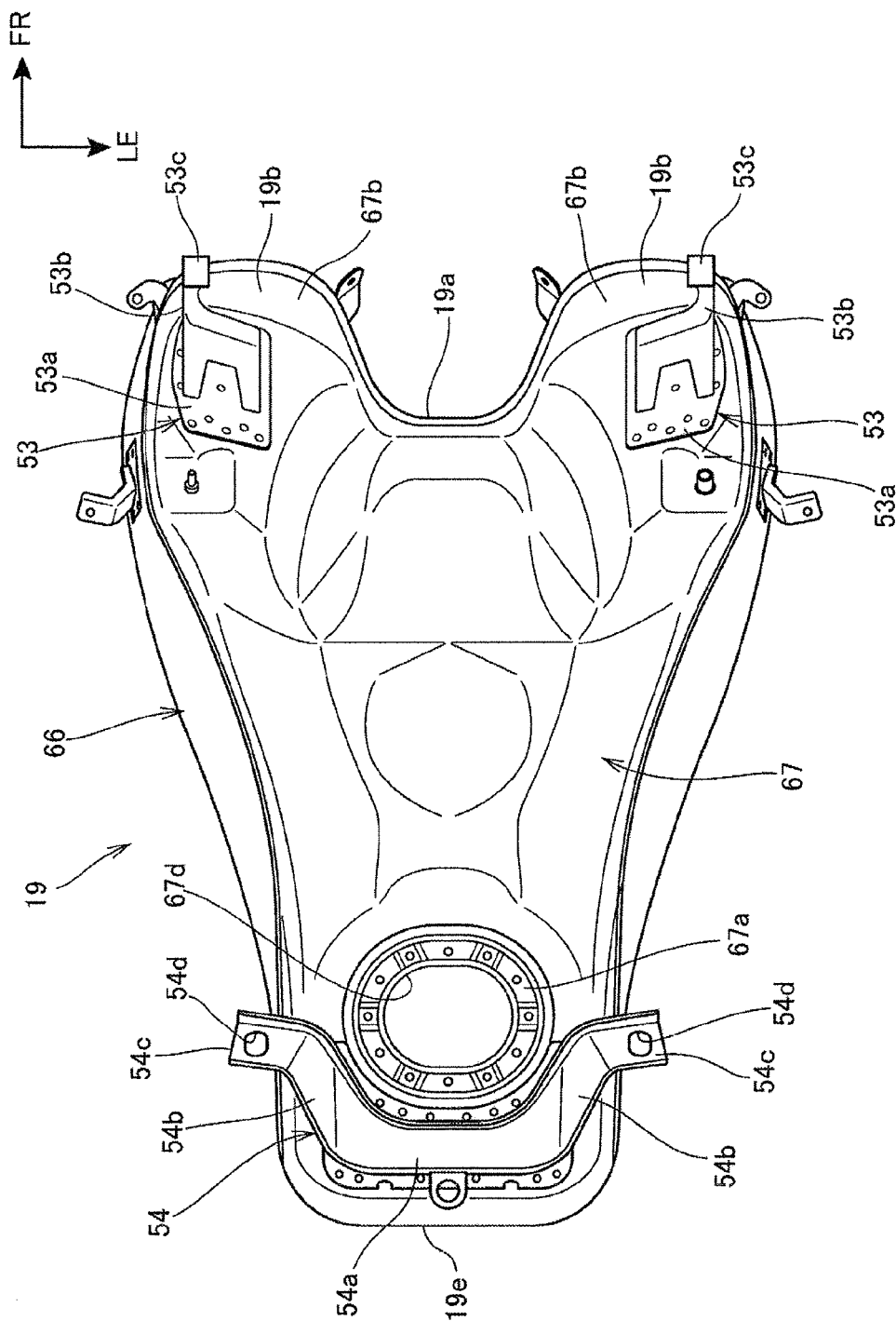
FIG. 7 is a bottom view showing the fuel tank.

FIG. 5 is a side view showing the fuel tank 19. FIG. 6 is a plain view showing the fuel tank 19. FIG. 7 is a bottom view showing the fuel tank 19.

As shown in FIGS. 5 to 7, the fuel tank 19 is a reservoir including an upper plate 66 and a bottom plate 67. Convex portions 19b, 19b projected to the frontward direction of the vehicle are formed on both sides of a recess portion 19a of the front end portion of the fuel tank in the width direction of the vehicle.

A recess portion 66a recessed in the downward direction is formed on the front portion of the upper plate 66. A fuel filler opening 45 is separately installed to the recess portion 66a. The tank front cover 19t (see FIG. 1) covers the recess portion 66a. Moreover, a hook retainer portion 71 hooked by a hook provided on the bottom plate of the seat 12 is installed to the rear portion of the upper plate 66.

The front brackets 53 are installed to convex portions 67b, 67b of the bottom plate 67 configuring the right and left of convex portions 19b, 19b, respectively. The front bracket 53 has a plate portion 53a installed to the convex portion 67b, an arm portion 53b extending obliquely frontward from the plate portion 53a to the downward direction and a cylindrical installation portion 53c installed to the tip portion of the arm portion 53b. A part of the arm portion 53b and the installation portion 53c project below a lower end 19c of the fuel tank 19 in the side view, simultaneously, the installation portions 53c are overlapped with front edges 19d of the convex portions 19b, 19b in the plan view. More specifically, the installation portions 53c are positioned below the front edges 19d, 19d.

An oblong shaped pump installation portion 67a on which the fuel pump 51 (see FIG. 4) is installed, is provided on the rear portion of the bottom plate 67. The rear bracket 54 integrally formed by bending a plate is joined to the bottom plate 67 between the pump installation portion 67a and the rear edge 19e of the fuel tank 19. The rear bracket 54 has a base portion 54a fixed on the bottom plate 67, right and left of extended portions 54b, 54b bending from the base portion 54a and extending obliquely frontward to the side direction of the fuel tank 19, and installation portions 54c bending from the extended portions 54b, 54b to the outer side directions of the fuel tank 19, respectively. The base portion 54a and the extended portions 54b, 54b are installed to the bottom plate 67 along the rear portion of the pump installation portion 67a. Bolt insertion holes 54d for inserting the bolt are opened on the installation portion 54c to the right and left of center frames 15, 15 (see FIG. 4) with bolts. Moreover, a sign 67d shows a pump insertion hole through which the fuel pump 51 is inserted.

The above-mentioned pump installation portion 67a needs the reinforcement member due to the fact that the pump insertion hole 67d is opened. The rear bracket 54 provided along the pump installation portion 67a can reinforce the pump installation portion 67a.

Figure 8:
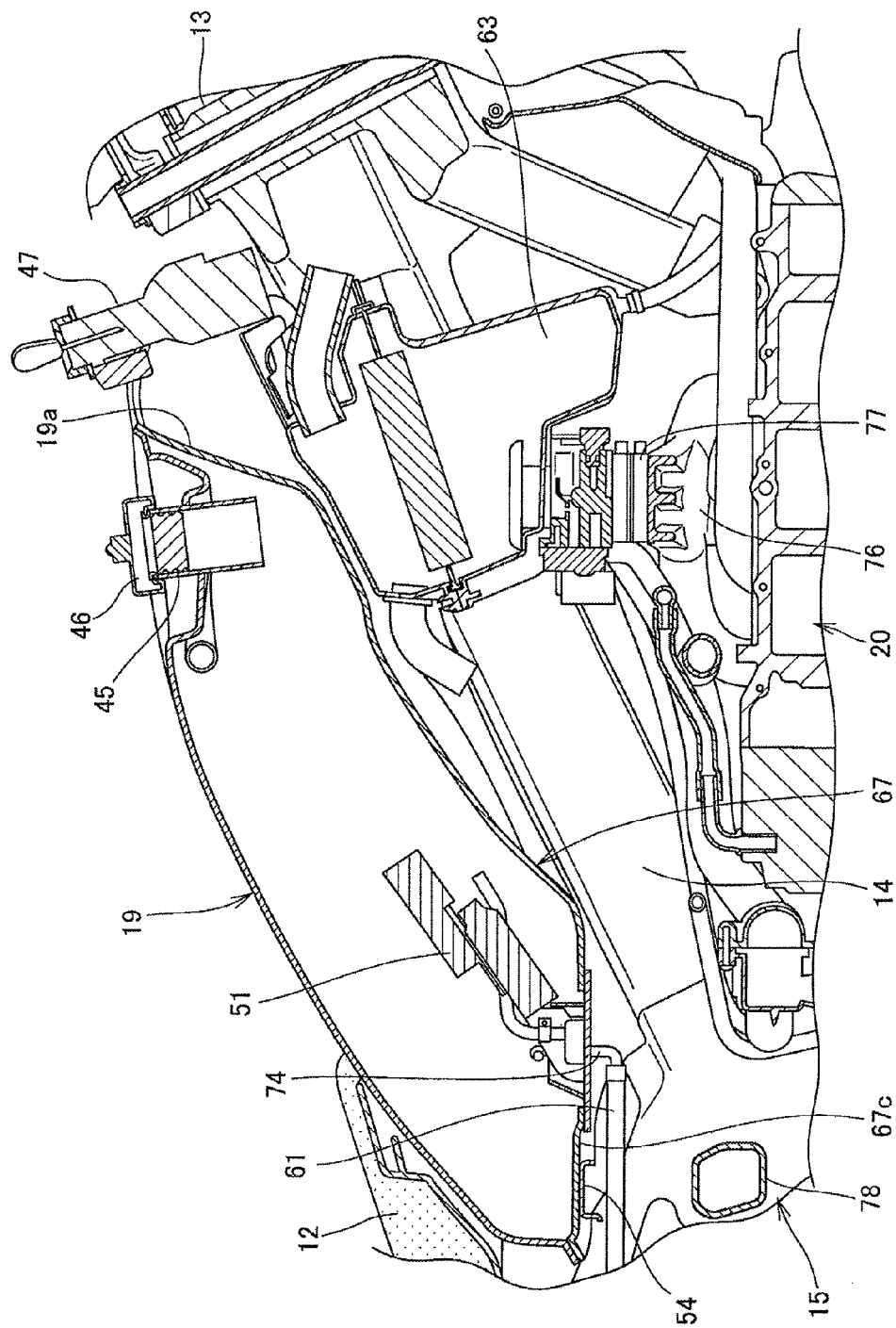
FIG. 8 is a sectional view taken along a VIII-VIII line in FIG. 2.

FIG. 8 is a sectional view taken along a VIII-VIII line in FIG. 2.

The fuel tank 19 is configured such that a flat portion 67c is formed on the lowest position of the rear portion of the bottom plate 67. The fuel pump 51 is installed to the flat portion 67c. The end portion of a fuel discharge pipe 74 projects in an L-shape from the lower portion of the fuel pump 51 to the rearward direction of the vehicle. The fuel piping 61 is connected to the end portion of the fuel discharge pipe 74. The fuel piping 61 extends from the fuel discharge pipe 74 to the rearward direction, and makes a U-turn and extends obliquely frontward to the lower direction. The tip portion is connected to the fuel injection valve of the intake device of the engine 20.

The recess portion 19a recessed to the rearward direction of the vehicle is formed on the front end portion of the fuel tank 19. The recess portion 19a keeps the clearance between the key cylinder 47 installed to the main frame 14 and the fuel tank.

The engine 20 is disposed below the fuel tank 19. The air cleaner 63 is disposed between the front portion of the fuel tank 19 and the engine 20. A throttle body 77 is connected to the right and left of cylinder portions 21 (see FIG. 3) of the engine 20 through an intake manifold 76. The air cleaner 63 is connected to the upper end portion of the throttle body 77.

The right and left of center frames 15 are integrally connected through a cross frame 78 extending to the width direction of the vehicle.

The swing arm 11 (see FIG. 1) is connected to the cross frame 78 through a rear shock absorber unit (not shown).

The above-mentioned manner for configuring the maintenance space 80 by lifting the rear portion of the fuel tank 19 will be explained next.

Figure 9:
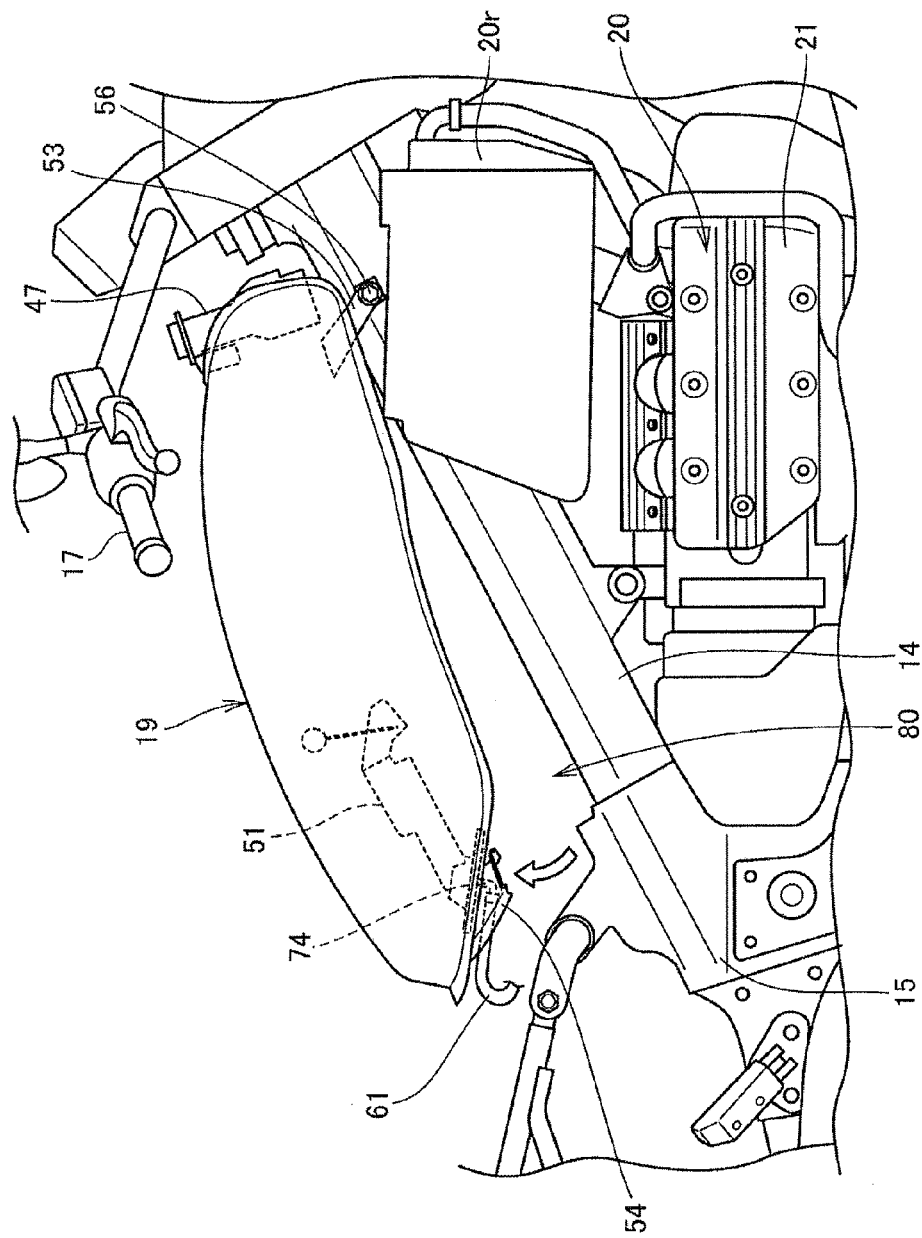
FIG. 9 is a functional view showing the function of the fuel tank structure.

FIG. 9 is a functional view showing the function of the fuel tank structure.

Firstly, in FIG. 2, the side radiator shrouds 25, 25 disposed on both sides of the fuel tank 19, the seat 12, the right and left of side covers 27, 27, and the tank front cover 19t (see FIG. 1) on the front upper portion of the fuel tank 19 are detached.

Then, in FIGS. 3 and 7, the bolts 56, 56 fixing the right and left of front bracket 53 of the fuel tank 19 on the right and left of main frames 14, respectively are loosened.

In addition, in FIGS. 2, 4, and 6, the bolts 57, 57 fixing the rear brackets 54 of the fuel tank 19 respectively on the right and left of center frames 15 are loosened and detached. Accordingly, as shown in FIG. 9, the fuel tank 19 is rotatable around the bolt 56 by lifting the rear portion of the fuel tank 19, as shown in a void arrow. As a result, the maintenance space 80 can be formed below the fuel tank 19 and above the main frame 14 and the center frame 15. The passenger can perform the maintenance around the fuel pump 51 as an example by inserting his/her hand into the maintenance space 80 from the right side in the width direction of the vehicle without interference by the fuel piping 61.

Moreover, as the fuel tank 19 is further rotated to the direction shown by the void arrow, the upper edge of the recess portion 19a of the fuel tank 19 abuts on the key cylinder 47, which restricts the rotation of the fuel tank 19.

As shown in above-mentioned FIGS. 1, 3, 8, and 9, in the fuel tank structure of the motorcycle 1 as the straddle type vehicle including the body frame F having the head pipe 13 and the main frame 14 extending from the head pipe 13 to the rearward direction, the fuel tank 19 supported on the main frame 14 and disposed above the main frame 14, the fuel pump 51 installed to the bottom plate 67 of the rear portion of the fuel tank 19 and the maintenance space 80 formed below the fuel pump 51 when the rear portion of the fuel tank 19 is lifted in the state that the installation portion 53c as the front supporting portion of the fuel tank 19 is rotatably supported on the main frame 14. The front supporting portion 53c of the fuel tank 19 is disposed on the front bracket 53 extending from the bottom plate 67 to the downward direction.

According to the structure, the overlap between the front portion of the fuel tank 19 and the main frame 14 in the side view can be reduced and the wide space below the fuel tank 19 can be secured by disposing the bolt 56 as the rotational shaft of the fuel tank 19 below the bottom plate 67 with or without the rotation of the fuel tank 19. Moreover, the tank capacity can be secured by reducing the clearance of the fuel tank 19.

Moreover, as shown in FIGS. 3, 5, 6, and 9, the installation portion 53c is disposed below the front end of the fuel tank 19 when the fuel tank 19 is mounted on the vehicle body. Accordingly, increasing the distance between the fuel pump 51 and the installation portion 53c can expand the maintenance space 80 below the fuel tank 19 with a small rotating angle. The tank capacity can be secured by reducing the clearance of the fuel tank 19.

In addition, as shown in FIGS. 4, 8, and 9, the fuel piping 61 extending from the fuel pump 51 is configured so as to be connected with the one end of the fuel piping to the fuel pump 51 below the fuel tank 19, to pass the rearward direction and the left side of the fuel pump 51 in the width direction of the vehicle, and to extend to the frontward direction of the fuel pump 51. Accordingly, interference with the fuel piping 61 can be avoided due to the fact that the passenger performs the maintenance of the fuel piping 61 below the fuel tank 19 from the right side in the width direction of the vehicle.

Moreover, as shown in FIGS. 4 and 9, the side stand 64 is disposed on the left side of the motorcycle 1 (see FIG. 1) in the width direction of the vehicle. Accordingly, the fuel supply to the engine 20 during the idling stop with the side stand 64 down can be improved by disposing the fuel piping 61 on the same side with the side stand 64. The vehicle body is inclined such that the right side thereof in the width direction of the vehicle becomes the upper side of the vehicle body during the maintenance. Accordingly, the maintenance space 80 below the fuel tank 19 is faced in the upward direction, which improves the maintenance performance.

In addition, as shown in FIGS. 1, 4, 5 and 7, the main frames 14 are provided in the right and left pair and are bifurcated from the head pipe 13 to the right and left and extend to the rearward direction so as to be inclined downwardly, and the installation portion 53c is supported by the bolt 56 screwed in the width direction of the vehicle to the boss portion 14a formed on the outer surface of the main frame 14. Accordingly, the fuel tank 19 is rotatable around the installation portion 53c with the bolt 56 loosened and can be fixed on the main frame 14 with the bolt 56 tightened.

Moreover, as shown in FIGS. 2, 6, and 9, the fuel tank 19 has the recess portion 19a recessed to the rearward direction in the center of the front end of the fuel tank.

Accordingly, the interference between the fuel tank 19 and the key cylinder 47 as a component in the vehicle body side can be avoided. Simultaneously, the key cylinder 47 can restrict the slant of the fuel tank to the frontward direction.

In addition, as shown in FIGS. 3, 5, and 9, the radiator 20r is disposed in the outer side direction of the body frame F (see FIG. 1) with the side radiator shroud 25 covering the upper portion of the radiator 20r and the side direction of the installation portion 53c. Accordingly, the installation portion 53c can be protected without increasing the number of the components due to the fact that the side radiator shroud 25 also covers the installation portion 53c.

Moreover, as shown in FIGS. 1, 3, 5, and 6, the center frame 15 configuring the body frame F is connected to the rear end of the main frame 14, the installation portion 54c as a rear installation portion provided on the rear portion of the fuel tank 19 is installed to the center frame 15, the side cover 27 is disposed below the fuel tank 19 and covers the installation portion 54c. Accordingly, the installation portion 54c can be protected without increasing the number of the components due to the fact that the side cover 27 covering below the fuel tank 19 also covers the installation portion 54c.

In addition, as shown in FIGS. 7, 8, the installation portions 54c are provided on both ends projecting to the outer side in the width direction of the vehicle of the rear bracket 54 installed to the bottom plate 67. The rear bracket 54 is installed to the bottom plate 67 along the pump installation portion 67a provided on the bottom plate 67 for installing the fuel pump 51. Accordingly, the rear bracket 54 can reinforce the pump installation portion 67a. Thus, is it possible to not use a special reinforcement member or to downsize the reinforcement member when the reinforce member is added.

The above-mentioned embodiment simply shows the one embodiment of the present invention. Optional modifications and applications should be possible within the scope of the present embodiment.

Moreover, the present invention can be applied not only to the motorcycle 1 but also to straddle type vehicles which are not motorcycles.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. In a fuel tank structure for a straddle vehicle including:
a body frame having a head pipe and a main frame extending from the head pipe in a rearward direction;
a fuel tank supported on the main frame and disposed above said main frame, said fuel tank having a recess portion recessed in a rearward direction in a center of a front end of the fuel tank;
a fuel pump installed to a tank bottom plate of a rear portion of the fuel tank; and
a maintenance space formed below said fuel pump when the rear portion of the fuel tank is lifted in a state wherein left and right front supporting portions of the fuel tank are rotatably supported on said main frame;
said left and right front supporting portions of said fuel tank being connected to left and right front brackets, respectively, extending from said tank bottom plate from a rearward side to a front side in a downward direction;
wherein said main frames are provided in a right and left pair and bifurcated from said head pipe to the right and left and extending in the rearward direction so as to be inclined downwardly, and
front end portions of said left and right front supporting portions are supported by bolts screwed in a width direction of the vehicle to a boss portion formed on a left side surface and a right side surface of said main frame.

2. The fuel tank structure for the straddle vehicle according to claim 1, wherein said left and right front supporting portions are disposed below the front end of said fuel tank when said fuel tank is mounted on the vehicle body.

3. The fuel tank structure for the straddle vehicle according to claim 1, wherein a fuel piping extending from said fuel pump is connected with one end of the fuel piping to said fuel pump below said fuel tank, to pass in the rearward direction and on one side of the fuel pump in the width direction of the vehicle and to extend to a forward direction of the fuel pump.

4. The fuel tank structure for the straddle vehicle according to claim 2, wherein a fuel piping extending from said fuel pump is connected with one end of the fuel piping to said fuel pump below said fuel tank, to pass in the rearward direction and on one side of the fuel pump in the width direction of the vehicle and to extend to a forward direction of the fuel pump.

5. The fuel tank structure for the straddle vehicle according to claim 1, wherein a side stand is disposed on one side of a straddle vehicle in a width direction of the vehicle.

6. The fuel tank structure for the straddle vehicle according to claim 2, wherein a side stand is disposed on one side of a straddle vehicle in a width direction of the vehicle.

7. The fuel tank structure for the straddle vehicle according to claim 3, wherein a side stand is disposed on one side of a straddle vehicle in the width direction of the vehicle.

8. The fuel tank structure for the straddle vehicle according to claim 1, wherein a radiator is disposed in an outer side direction of the body frame; and
a side radiator shroud covers an upper portion of the radiator and a side direction of said front supporting portion.

9. The fuel tank structure for the straddle vehicle according to claim 2, wherein a radiator is disposed in an outer side direction of the body frame; and
a side radiator shroud covers an upper portion of the radiator and a side direction of said front supporting portion.

10. The fuel tank structure for the straddle vehicle according to claim 1, wherein a center frame is connected to a rear end of said main frame;
a rear installation portion provided on the rear portion of said fuel tank is installed to the center frame; and
a side cover is disposed below said fuel tank and covers said rear installation portion.

11. The fuel tank structure for the straddle vehicle according to claim 2, wherein a center frame is connected to a rear end of said main frame;
a rear installation portion provided on the rear portion of said fuel tank is installed to the center frame; and
a side cover is disposed below said fuel tank and covers said rear installation portion.

12. The fuel tank structure for the straddle vehicle according to claim 10, wherein said rear installation portions are provided on both ends projecting to the outer side in a in the width direction of the vehicle of a rear bracket installed to said tank bottom plate; and
said rear bracket is installed to said tank bottom plate along a pump installation portion provided on said tank bottom plate for installing said fuel pump.

13. A fuel tank structure for a straddle vehicle comprising:
a fuel tank supported on a main frame and disposed above said main frame said fuel tank having a recess portion recessed in a rearward direction in a center of a front end of the fuel tank;
a fuel pump installed to a tank bottom plate of a rear portion of the fuel tank;
a pivot point for rotation of the fuel tank relative to the main frame;
a maintenance space formed below said fuel pump when the rear portion of the fuel tank is lifted in a state wherein left and right front supporting portions of the fuel tank are rotatably supported on said main frame about the pivot point; and
said left and right front supporting portions of said fuel tank being connected to left and right front brackets, respectively, extending from said tank bottom plate from a rearward side to a front side in a downward direction and connected to the pivot point;
wherein said main frames are provided in a right and left pair and bifurcated from said head pipe to the right and left and extending in the rearward direction so as to be inclined downwardly, and
front end portions of said left and right front supporting portions are supported by bolts screwed in a width direction of the vehicle to a boss portion formed on a left side surface and a right side surface of said main frame.

14. The fuel tank structure for the straddle vehicle according to claim 13, wherein said left and right front supporting portions are disposed below the front end of said fuel tank when said fuel tank is mounted on the vehicle body.

15. The fuel tank structure for the straddle vehicle according to claim 1, wherein the width between left and right front supporting portions is larger relative to a width between left and right rear supporting portions.

16. The fuel tank structure for the straddle vehicle according to claim 1, wherein the left and right front supporting portions are overlapped by the fuel tank in a plan view.

* * * * *